(12) United States Patent
Negru

(10) Patent No.: US 10,033,199 B2
(45) Date of Patent: *Jul. 24, 2018

(54) BATTERY STACK CONFIGURATION IN A MULTI-BATTERY SUPPLY SYSTEM

(71) Applicant: Sorin Laurentiu Negru, San Jose, CA (US)

(72) Inventor: Sorin Laurentiu Negru, San Jose, CA (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,907

(22) Filed: Sep. 19, 2016

(65) Prior Publication Data

US 2017/0012443 A1    Jan. 12, 2017

Related U.S. Application Data

(63) Continuation of application No. 14/141,989, filed on Dec. 27, 2013, now Pat. No. 9,461,487.

(51) Int. Cl.

| H02J 7/00 | (2006.01) |
|---|---|
| H02J 7/14 | (2006.01) |
| G06F 1/26 | (2006.01) |
| H02M 3/04 | (2006.01) |
| H01M 10/44 | (2006.01) |
| H02J 7/34 | (2006.01) |
| H01M 10/48 | (2006.01) |

(52) U.S. Cl.
CPC ............. *H02J 7/0013* (2013.01); *G06F 1/26* (2013.01); *G06F 1/263* (2013.01); *H02J 7/0022* (2013.01); *H02J 7/0024* (2013.01); *H02J 7/0042* (2013.01); *H02J 7/0068* (2013.01); *H02M 3/04* (2013.01); *H01M 10/44* (2013.01); *H01M 10/482* (2013.01); *H02J 7/0014* (2013.01); *H02J 7/0016* (2013.01); *H02J 7/0018* (2013.01); *H02J 7/34* (2013.01)

(58) Field of Classification Search
USPC ........ 320/116, 117, 118, 120, 121, 122, 123, 320/127, 128, 140, 137
See application file for complete search history.

(56) References Cited

U.S. PATENT DOCUMENTS

| 5,652,499 | A | 7/1997 | Morita |
|---|---|---|---|
| 5,721,481 | A | 2/1998 | Narita |
| 6,225,708 | B1 | 5/2001 | Furukawa |
| 6,268,711 | B1 | 7/2001 | Bearfield |
| 6,504,340 | B1 | 1/2003 | Lee |
| 7,068,011 | B2 | 6/2006 | Yang |
| 8,084,887 | B2 | 12/2011 | Weidenheimer et al. |
| 8,174,856 | B2 | 5/2012 | Chapman |

(Continued)

*Primary Examiner* — Alexis Pacheco
(74) *Attorney, Agent, or Firm* — Donald E. Schreiber

(57) ABSTRACT

A reconfigurable multi-battery pack system for inclusion in a hand held device for more efficiently energizing battery powered operation of both a buck DC-DC converter and a boost DC-DC converter included in the device. Also disclosed is a power management circuit that autonomously:

1. connects the batteries in parallel during battery recharging; and
2. connects at least two (2) of the batteries in series when the batteries are not being recharged and are energizing operation of the DC-DC converters.

3 Claims, 4 Drawing Sheets

(56) References Cited

U.S. PATENT DOCUMENTS

| | | |
|---|---|---|
| 8,288,992 B2 | 10/2012 | Kramer et al. |
| 8,436,580 B2 | 5/2013 | Tai |
| 8,587,251 B2 | 11/2013 | Nakashima |
| 9,461,487 B2 * | 10/2016 | Negru .................. G06F 1/26 |
| 2001/0026147 A1 | 10/2001 | Nakashimo |
| 2011/0109166 A1 | 5/2011 | Oga |
| 2011/0193525 A1 | 8/2011 | Ro |
| 2011/0279085 A1 | 11/2011 | Shigemizu |
| 2012/0206101 A1 | 8/2012 | Shilmkar |
| 2012/0293128 A1 | 11/2012 | Kim |
| 2013/0335028 A1 | 12/2013 | Choi |
| 2014/0126284 A1 | 5/2014 | Qahouq et al. |

* cited by examiner

BATTERY STACK CONFIGURATION IN A MULTI-BATTERY SUPPLY SYSTEM

This patent application is a continuation of U.S. patent application Ser. No. 14/141,989 filed Dec. 27, 2013.

BACKGROUND

Technical Field

The present disclosure relates generally to electrical power management for hand held equipment, particularly managing electrical power supplied from several batteries.

Background Art

Tablet computers such as Apple Corporation's iPad®, Amazon's Kindle Fire and Barnes & Noble's Nook include a power management integrated circuit ("PMIC") for converting electrical power at a battery's voltage to other required voltages. Usually, a tablet computer's PMIC provides electrical power at two (2) different voltages, i.e.:

1. a low voltage in the range of 1.8 v or lower for energizing operation of the tablet computer microprocessor ("µP") and perhaps other integrated circuits ("ICs") included therein; and
2. a higher voltage in the range of 20-40 v for energizing operation of the tablet computer's display.

As illustrated schematically in a block diagram FIG. 1A, a tablet computer frequently has battery system 22 that includes three (3) individual Li-Ion battery packs 24. In the illustration of FIG. 1A, a buck converter circuit 26 converts the voltage of direct current electrical power from the battery system 22, e.g. 4 v, to a lower voltage direct current electrical power, e.g. 1.8 v. Similarly, a boost converter circuit 28 converts the voltage of direct current electrical power from the battery system 22 to a higher voltage direct current electrical power, e.g. 24 or 36 v.

The configuration of the battery system 42 and the buck and boost converter circuits 26, 28 depicted in FIG. 1A uses a single battery voltage connected respectively to power inputs 32 of the buck and boost converter circuits 26, 28 for generating both 1.8 v and 36 v electrical power. The parallel arrangement of the battery packs 24 depicted in FIG. 1A is simple though it requires a high current for charging the battery packs 24 in parallel. However, the configuration depicted in FIG. 1A is not optimized for efficient power conversion by a PMIC. The depicted configuration favors efficient electrical power conversion by the buck converter circuit 26 but sacrifices electrical power conversion efficiency by the boost converter circuit 28.

As depicted in FIG. 1A, a tablet computer also usually includes a battery charger circuit 36 for supplying electrical power for recharging the battery packs 24. In conventional tablet computers the battery charger circuit 36 includes an input terminal 38 that receives electrical power from an external power source usually at approximately 5.0 v.

FIG. 1B illustrates in greater detail a power management circuit included in a typical hand held device 48 such as a tablet computer. Such a hand held device may include several individual buck converter circuits 26a, 26b, 26c that respectively supply electrical power at 1.0 v, 3.3 v and 2.5 v to a microprocessor 52, a WI-FI transceiver 54, and a RAM memory 56. The boost converter circuit 28 included in the hand held device 48 supplies electrical power to a display 58 at perhaps 24.0 v.

In addition to the battery charger circuit 36, the hand held device 48 also includes a detector circuit 62 that senses connection of an electrical power source such as an AD/DC adaptor 64 to the input terminal 38 of the hand held device 48. The detector circuit 62 responds to connecting a AD/DC adaptor 64 to the input terminal 38 by supplying a signal for closing a normally open switch 66 located between the battery charger circuit 36 and the battery system 22 so a recharging current flows to the battery packs 24.

U.S. Pat. No. 6,504,340 entitled "Hands-free Kit for Mobile Phones Using Solar Cell" that issued Jan. 7, 2003, on a patent application filed by Sea Sun Lee ("the '340 patent") discloses, similar to the illustration of FIG. 1A, a configuration for recharging one or more batteries. During recharging, the batteries are connected in parallel with each other and with a solar cell that provides a low voltage source of charging electrical power. When supplying electrical power for energizing the operation of a disclosed "hands-free kit," the rechargeable batteries become connected in series. While the batteries are being charged in parallel, the '340 patent's "hands-free kit" is inoperable.

Published United States Patent Application No. 2012/0293128 entitled "Battery Pack" filed by Bongyoung Kim and Kiho Shin that was published Nov. 22, 2012, similarly discloses connecting a plurality of batteries:

1. in parallel during high-efficiency charging that reduces overall charging time; and
2. in series when providing high-output voltage for energizing operation of a hand held electronic device such as a cellular phone, a notebook computer, a camcorder, or a personal digital assistant (PDA).

BRIEF SUMMARY

The present disclosure provides a multi-battery pack system that when the batteries are not being recharged reconfigures the batteries for more efficiently energizing operation of a hand held device such as a tablet computer.

Briefly, disclosed are a method for reconfiguring a multi-battery pack system for more efficiently energizing a hand held device's operation, and a power management circuit for autonomously reconfiguring a hand held device's multi-battery pack system so the device operates more efficiently.

The disclosed battery reconfiguration method more efficiently energizes operation of the hand held device that includes:

1. at least two (2) rechargeable batteries;
2. a buck DC-DC converter; and
3. a boost DC-DC converter.

Each of the DC-DC converters respectively has a power input that receives electrical power for energizing the converters' operation. The method includes connecting the batteries in series with:

1. the series connected batteries being connected to the power input of the boost DC-DC converter for energizing the operation thereof; and
2. one of the series connected batteries being connected to the power input of the buck DC-DC converter for energizing the operation thereof.

Configured in this way the hand held device's boost DC-DC converter operates more efficiently in comparison with operation thereof being energized by the batteries connected in parallel.

Also disclosed is a battery powerable device that includes:

1. at least two (2) rechargeable batteries;
2. a buck DC-DC converter; and
3. a boost DC-DC converter.

Each of the DC-DC converters respectively has a power input that receives electrical power for energizing the converters' operation. The battery powerable device includes a power management circuit that, when the device is connected to a electrical power source for recharging the batteries, configures the batteries in parallel with the parallel connected batteries being connected to the power inputs of the buck and boost DC-DC converters for energizing their operation. When the device is not connected to an electrical power source for recharging the batteries, the power management circuit connects at least two (2) batteries in series with:

1. the series connected batteries being connected to the power input of the boost DC-DC converter for energizing the operation thereof; and
2. one of the series connected batteries being connected to the power input of the buck DC-DC converter for energizing the operation thereof.

By configuring the batteries in this way the power management circuit advantageously makes the hand held device's boost DC-DC converter operate more efficiently in comparison with operation thereof being energized by the batteries connected in parallel.

These and other features, objects and advantages will be understood or apparent to those of ordinary skill in the art from the following detailed description of the preferred embodiment as illustrated in the various drawing figures.

DETAILED DESCRIPTION

Figure 2:
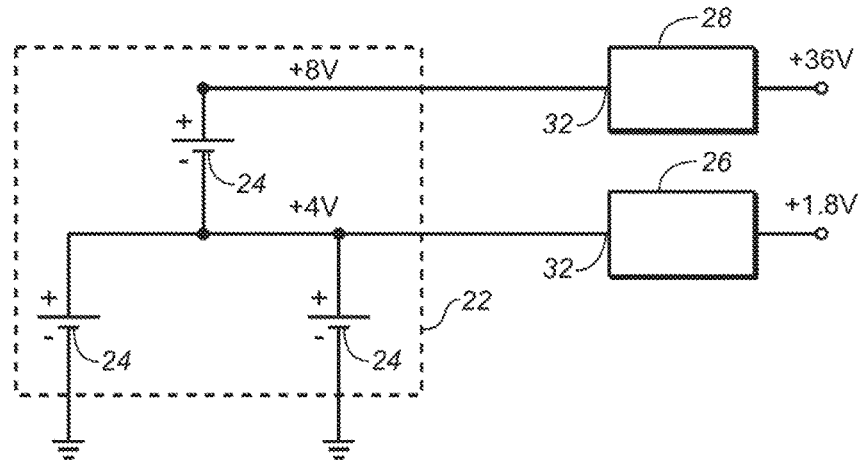
FIG. 2 is a block diagram depicting a reconfiguration of the battery system, the buck converter circuit and the boost converter circuit depicted in FIG. 1A for more efficiently energizing operation of a hand held device such as a tablet computer.

FIG. 2 depicts a reconfiguration of the battery packs 24, the buck converter circuit 26 and the boost converter circuit 28 for more efficiently energizing operation of a hand held device such as a tablet computer. In the illustration of FIG. 2, two (2) of the battery packs 24 connect in parallel for supplying electricity to the power input 32 of the buck converter circuit 26 while the third battery pack 24 connects in series with the parallel connected pair of battery packs 24 for supplying electricity to the power input 32 of the boost converter circuit 28.

Those skilled in the art understand that the efficiency of a boost converter circuit, i.e. a converter circuit used for increasing voltage, is directly proportional to the input voltage. Conversely, those skilled in the art also know that the efficiency of a buck converter circuit, i.e. a converter circuit used for reducing voltage, is inversely proportional to the input voltage. Consequently, a buck converter circuit such as the buck converter circuit 26 receiving a 2.5 v-3.0 v supply voltage at the power input 32 thereof achieves high efficiency for producing 1.8 v DC electrical output power. Conversely, a boost converter circuit such as the boost converter circuit 28 receiving a 15.0 v-20.0 v supply voltage at the power input 32 thereof achieves high efficiency for producing 36 v DC electrical output power.

Figure 1A:
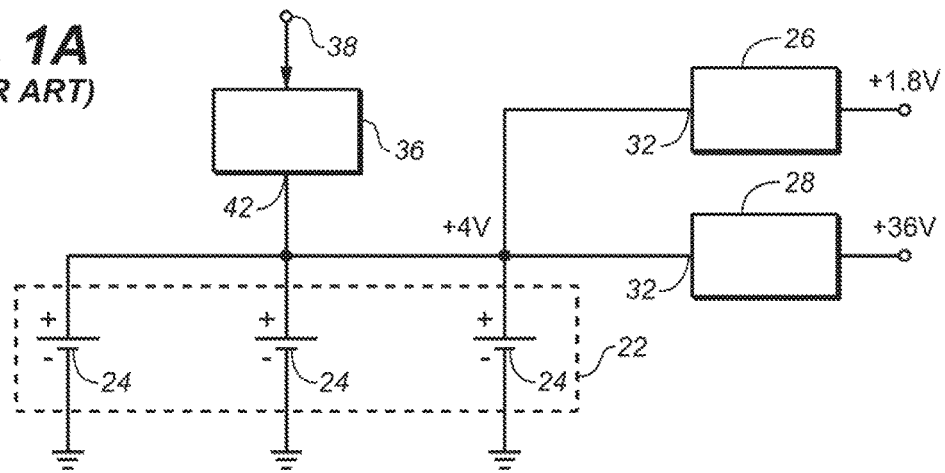
FIG. 1a is a block diagram schematically depicting a conventional configuration for supplying electrical power within a hand held device such as a tablet computer that includes a battery system, a battery charger circuit, a buck converter circuit and a boost converter circuit.

Consequently, the two (2) battery packs 24 supply electrical power to the power input 32 of the buck converter circuit 26 near an optimum voltage, i.e. 4.0 v. However, supplying this same electrical power at 4.0 v to the power input 32 of the boost converter circuit 28 as depicted in FIG. 1 causes its operation for producing 36 v DC electrical output power to be very inefficient. Connecting the third battery pack 24 in series with the pair of parallel connected battery packs 24 as depicted in FIG. 2 doubles to 8.0 v the voltage of electrical power supplied to the power input 32 for energizing operation of the boost converter circuit 28. Doubling the voltage energizing operation of the boost converter circuit 28 in this way reduces power dissipation within the boost converter circuit 28 by at least one-half in comparison with energizing the boost converter circuit with 4.0 v electrical power.

If in addition to producing electrical energy at the same voltage, e.g. 4.0 v, the battery packs 24 all store essentially the same amount of electrical energy, the configuration depicted in FIG. 2 matches a typical tablet computer's electrical power loads to the storage capacity of the battery packs 24. Typically a tablet computer imposes a 20 W load on the buck converter circuit 26 and a 6 W load on the boost converter circuit 28. That is, connecting two (2) battery packs 24 in parallel for supplying electrical energy to the power input 32 of the buck converter circuit 26 appropriately matches the electrical storage capacity of those battery packs 24 to the electrical power load supplied by the buck converter circuit 26.

Figure 3A:
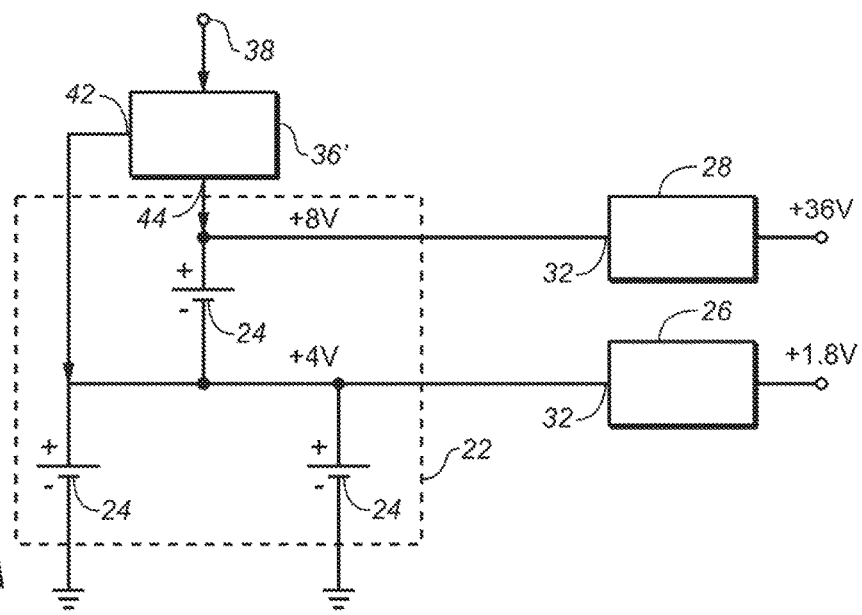
FIG. 3a is a block diagram depicting the reconfigured battery system, the buck converter circuit and the boost converter circuit depicted in FIG. 2 further equipped with a battery charger circuit that differs from the battery charger circuit depicted in FIG. 1A in that FIG. 3A's battery charger circuit is adapted for providing recharging current at two (2) different voltages for recharging batteries configured as depicted in FIG. 2.

There exist variations of the battery system 22 and the buck and boost converter circuits 26, 28 configurations depicted in FIG. 2 that also reduce electrical power dissipation in the boost converter circuit 28. One such alternative configuration depicted in FIG. 3A employs a static or fixed configuration for the battery packs 24 and the buck and boost converter circuits 26, 28 depicted in FIG. 2 while adding thereto a battery charger circuit 36' having electrical characteristics that differ from the battery charger circuit 36 depicted in FIG. 1. Specifically, the battery charger circuit 36 depicted in FIG. 3A includes a lower charging voltage output 42 for supplying recharging current directly to the pair of battery packs 24 connected in parallel. The battery charger circuit 36' also includes a higher charging voltage output 44 for supplying recharging current to the battery pack 24 that connects in series with the parallel connected pair of battery packs 24. Note that recharging current supplied from the higher charging voltage output 44 recharges not only the battery pack 24 connected to the power input 32 of the boost converter circuit 28 but also recharges the pair of parallel connected battery packs 24. Note further that electrical power supplied to the input terminal 38' of the battery charger circuit 36' must have a higher voltage than that supplied to the input terminal 38 of the battery charger circuit 36 depicted in FIG. 1, e.g. 10 v for the configuration depicted in FIG. 3A.

Figure 3B:
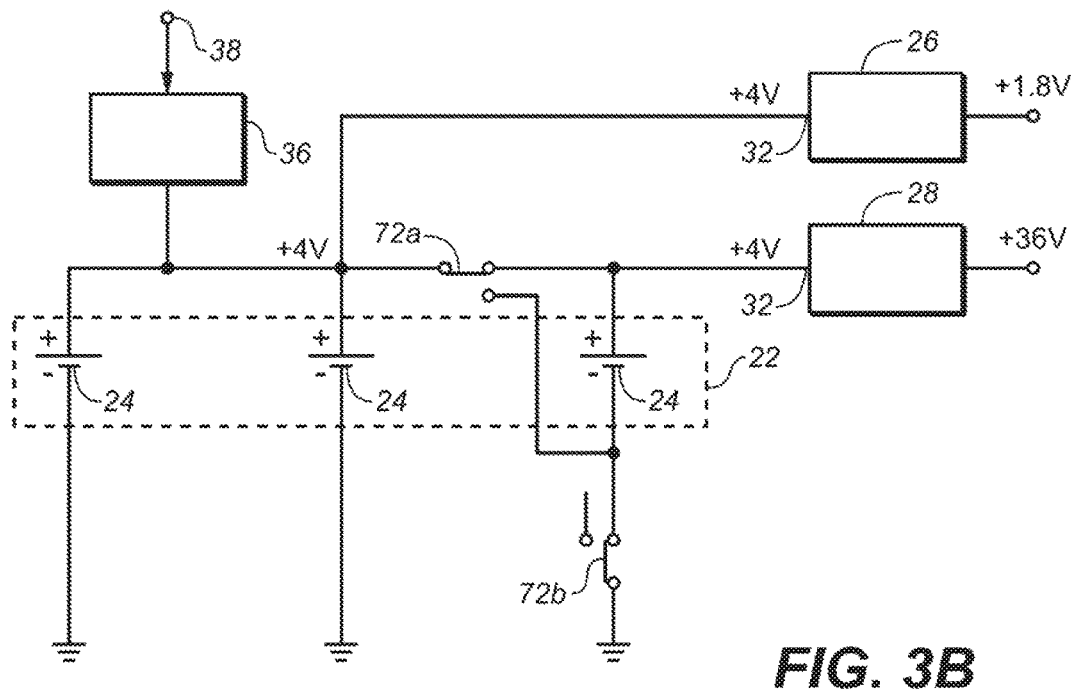
FIG. 3B is a block diagram depicting the reconfigured battery system, the buck converter circuit and the boost converter circuit depicted in FIG. 2 that is:
  a. equipped with the battery charger circuit depicted in FIG. 1A; and
  b. also further equipped with a pair of switches that dynamically rearrange battery connections from that for more efficient operation depicted in FIG. 2 into that for battery recharging depicted in FIG. 1A.

FIG. 3B depicts yet another configuration for the battery system 22 and the buck and boost converter circuits 26, 28 that differs from that depicted in FIG. 2 and that similarly reduces electrical power dissipation in the boost converter circuit 28 when operation of the hand held device is energized solely by the battery packs 24. The configuration depicted in FIG. 3B differs from the configuration depicted in FIG. 3A:
1. by using the same battery charger circuit 36 as that depicted in FIG. 1; and
2. by adding a pair of synchronously operated switches 72a, 72b to the configuration depicted in FIG. 2 with the switches connected respectively to terminals of the battery pack 24 that in the illustration of FIG. 2 connects to the power input 32 of the boost converter circuit 28.

Specifically, FIG. 3B depict an arrangement of the switches 72a, 72b in which the battery pack 24 that connects to the power input 32 of the boost converter circuit 28 also connects in parallel with the other two (2) battery packs 24 while the input terminal 38 of the battery charger circuit 36 receives electrical power from an external source at approximately 5.0 v for recharging all three (3) battery packs 24. Consequently, from a circuit topology perspective the configuration of the battery system 22 and the buck and boost converter circuits 26, 28 depicted in FIG. 3 is the same as that depicted in FIG. 1 with electrical power at 4.0 v energizing operation of both the buck and boast converter circuits 26, 28. While as described above this arrangement of the switches 72a, 72b reduces power conversion efficiency of the boost converter circuit 28 in comparison with the configuration depicted in FIG. 2, from a practical perspective the battery charger circuit 36 effectively provides a source of unlimited electrical power so lower electrical conversion efficiency of the boost converter circuit 28 is irrelevant to a hand held device's operation.

Figure 3C:
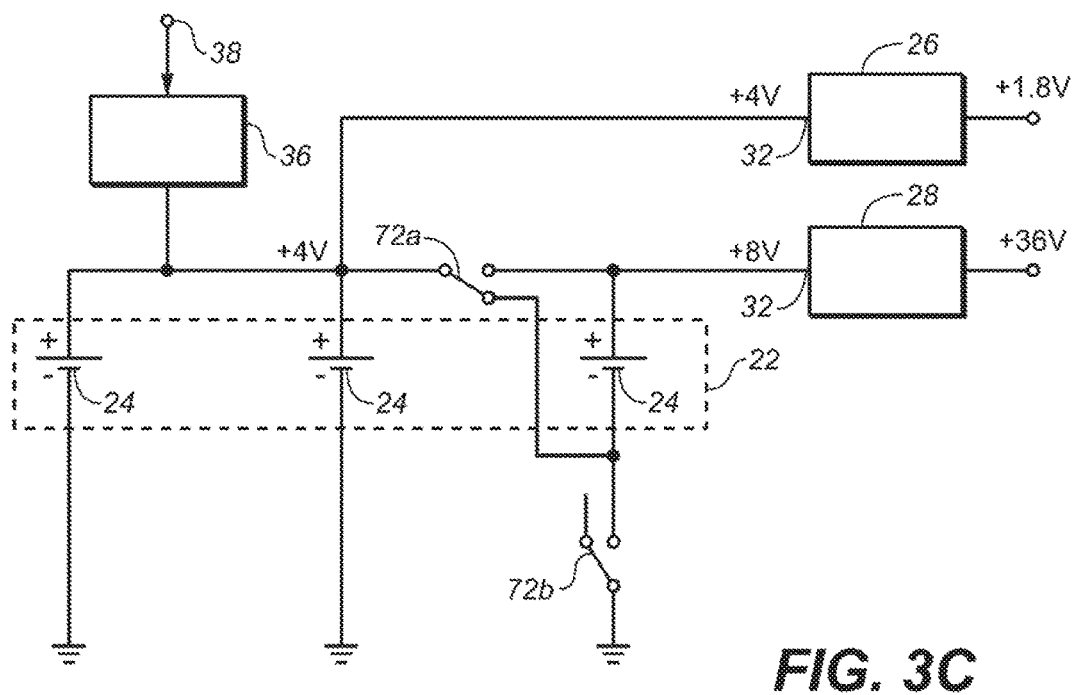
FIG. 3C is a block diagram depicting the reconfigured battery system, the buck converter circuit and the boost converter circuit depicted in FIG. 3B with the pair of switches arranged for more efficiently energizing operation of a hand held device such as a tablet computer when the batteries are not being recharged.

FIG. 3C illustrates the configuration of FIG. 3B when:
1. the input terminal 38 of the battery charger circuit 36 receives no electrical power from an external source for recharging the battery packs 24; and
2. operation of a hand held device is being energized solely by the battery system 22 with:
    a. only a single battery pack 24 connected to the power input 32 of the boost converter circuit 28; and
    b. the switches 72a, 72b connect that battery pack 24 to the parallel connected pair of battery packs 24 supplying electrical energy to the power input 32 of the buck converter circuit 26.

From a circuit topology perspective the configuration of the battery system 22 and the buck and boost converter circuits 26, 28 depicted in FIG. 3C is the same as that depicted in FIG. 2 with electrical power at 8.0 v energizing operation of the boost converter circuit 28. Since this arrangement of the switches 72a, 72b configures the battery system 22 and the buck and boost converter circuits 26, 28 the same as depicted in FIG. 2, electrical power dissipation in the boost converter circuit 28 only one-half of that exhibited by the configuration depicted in FIG. 1.

Figure 1B:
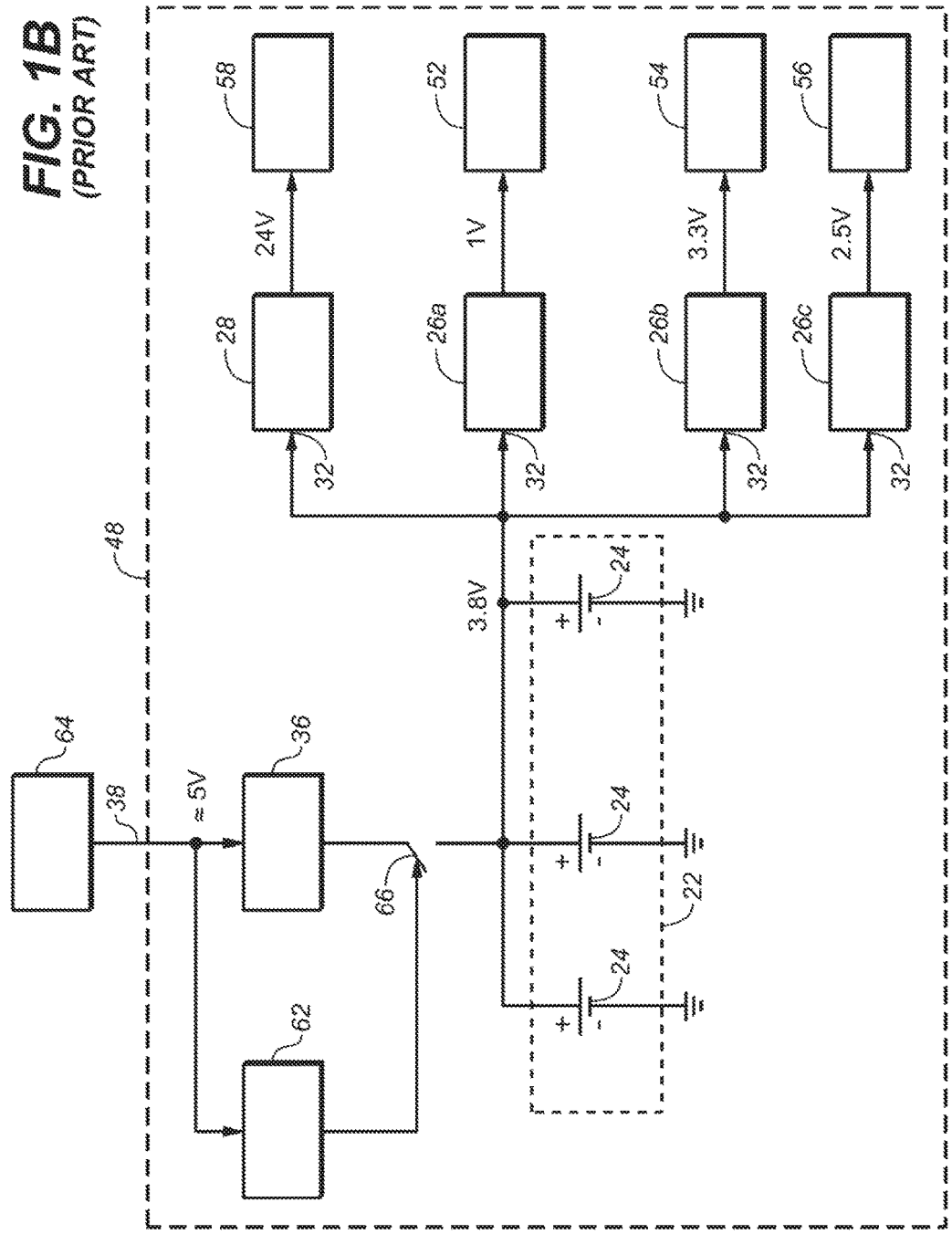
FIG. 1B is a block diagram schematically depicting in greater detail a power management circuit included in a typical hand held device such as a tablet computer.
Figure 4:
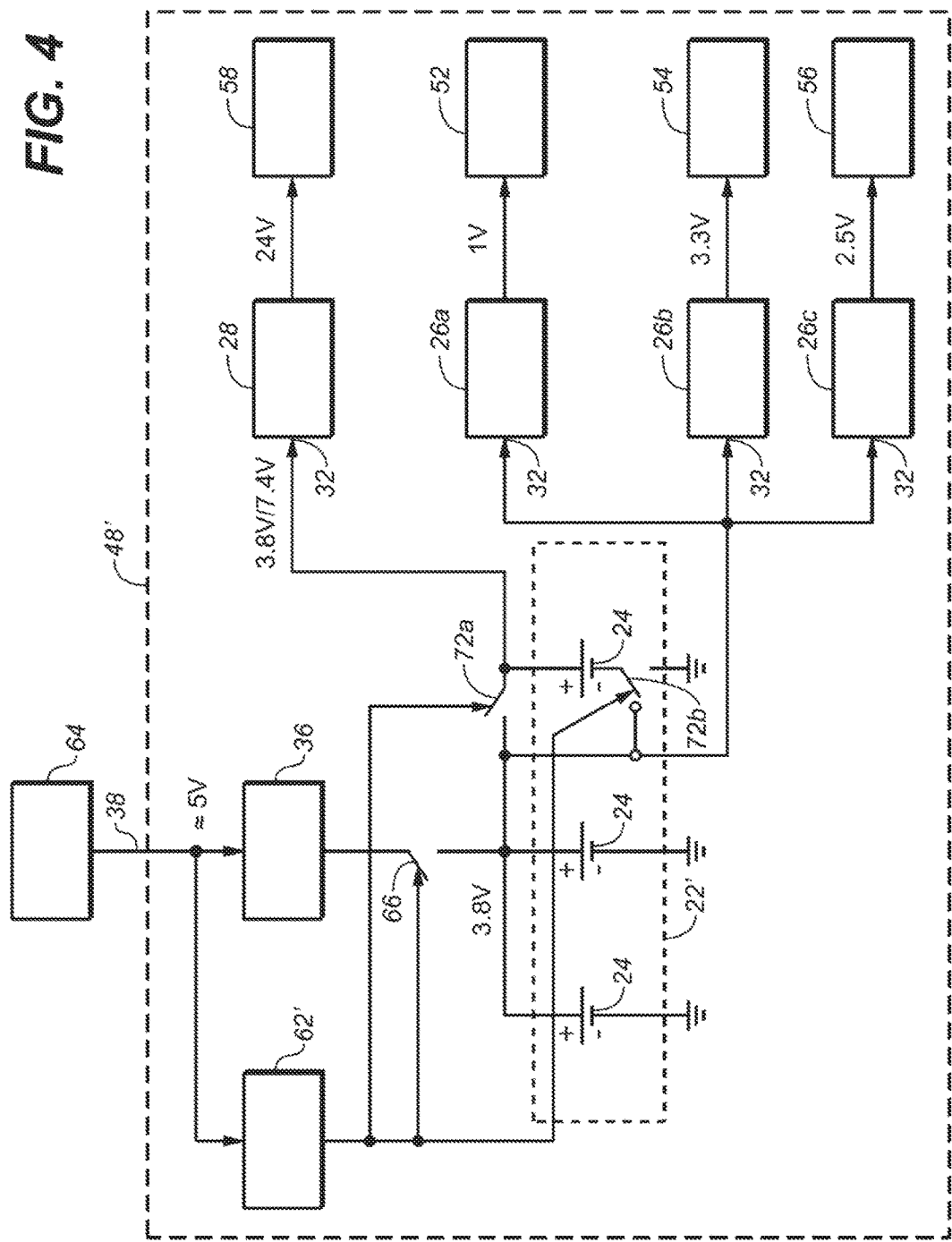
FIG. 4 is a block diagram schematically depicting in greater detail a power management circuit in accordance with the present disclosure:
  a. when included in a typical hand held device of the type depicted in FIG. 1B; and
  b. more efficiently energizing the hand held device's operation when the batteries are not being recharged.

The block diagram of FIG. 4 schematically illustrates one way in which the present disclosure may be implemented in the typical hand held device 48 depicted in FIG. 1b for more efficiently energizing operation thereof. The hand held device 48' depicted in FIG. 4 differs from that depicted in FIG. 1b by including the pair of synchronously operated switches 72a, 72b similar to those depicted in FIGS. 3B and 3C. The configuration of the switches 72a, 72b depicted in FIG. 4, while functionally equivalent to that depicted in FIGS. 3A and 3B, uses slightly different connections.

During battery recharging, similar to the illustration of FIG. 3B, the switch 72a depicted in FIG. 4 is closed thereby connecting together the positive (+) terminals of all battery packs 24 while the switch 72b depicted in FIG. 4 connects the negative (−) terminal of one of the battery packs 24 to circuit ground. Configured in this way the individual buck converter circuits 26a, 26b, 26c and the boost converter circuit 28 all receive identically the same lower voltage electrical power from the battery charger circuit 36 that is concurrently being supplied for recharging the battery packs 24.

When the battery packs 24 are not being recharged, rather than depicted in FIG. 3C the switch 72a connecting the negative (−) terminal of one of the battery packs 24 to the positive (+) terminal of the remaining battery packs 24, in the illustration of FIG. 4 the switch 72b connects the negative (−) terminal of one of the battery packs 24 to the positive (+) terminal of the remaining battery packs 24. Either of the alternative configurations illustrated in FIGS. 3C and 4, doubles the voltage being supplied to the boost converter circuit 28 in comparison with the voltage being supplied to the buck converter circuits 26a, 26b, 26c.

Finally, the detector circuit 62' included in the hand held device 48', in addition to responding to connection of a AD/DC adaptor 64 to the input terminal 38 by supplying a signal for closing the normally open switch 66, also supplies a pair of signals for respectively:
1. closing the switch 72a; and
2. changing the switch 72b from connecting;
    a. the negative (−) terminal of one of the battery packs 24 to the positive (+) terminal of the remaining battery packs 24; to
    b. the negative (−) terminal of the battery pack 24 to circuit ground.

Thus the additional pair of signals supplied by detector circuit 62' reconfigures the battery packs 24 from a configuration which more efficiently energizes operation of the hand held device 48' to a configuration for recharging the battery packs 24 in parallel, and conversely.

Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications will, no doubt, be suggested to those skilled in the art after having read the preceding disclosure. Accordingly, it is intended that the following claims be interpreted as encompassing all alterations, modifications, or alternative applications as fall within the true spirit and scope of the disclosure including equivalents thereof. In effecting the preceding intent, the following claims shall:
1. not invoke paragraph 6 of 35 U.S.C. § 112 as it exists on the date of filing hereof unless the phrase "means for" appears expressly in the claim's text;
2. omit all elements, steps, or functions not expressly appearing therein unless the element, step or function is expressly described as "essential" or "critical;"
3. not be limited by any other aspect of the present disclosure which does not appear explicitly in the claim's text unless the element, step or function is expressly described as "essential" or "critical;" and
4. when including the transition word "comprises" or "comprising" or any variation thereof, encompass a non-exclusive inclusion, such that a claim which encompasses a process, method, article, or apparatus that comprises a list of steps or elements includes not only those steps or elements but may include other steps or elements not expressly or inherently included in the claim's text.

What is claimed is:

1. A method for energizing operation of a device that includes at least two (2) rechargeable batteries, the device also including both at least one (1) buck DC-DC converter and at least one (1) boost DC-DC converter with each DC-DC converter respectively having a power input that receives electrical power for energizing DC-DC converter operation, the method comprising the step of connecting the batteries in series with:
   a. the series connected batteries being connected to the power input of the boost DC-DC converter for energizing the operation thereof; and
   b. one of the series connected batteries being connected to the power input of the buck DC-DC converter for energizing the operation thereof,
whereby during battery powered operation of the device the boost DC-DC converter operates more efficiently in comparison with operation thereof being energized by the batteries connected in parallel.

2. The method of claim 1 wherein the device further includes a battery charger circuit that receives electrical power from a electrical power source that is located outside the device, the battery charger circuit having both a lower charging voltage output and a higher charging voltage output for supplying individual recharging electrical currents to the batteries when the battery charger circuit is connected to the electrical power source, the method comprising the additional steps of:
   c. connecting the higher charging voltage output of the battery charger circuit to the series connected battery that connects to the power input of the boost DC-DC converter; and
   d. connecting the lower charging voltage output of the battery charger circuit to the battery that connects to the power input of the buck DC-DC converter.

3. The method of claim 1 wherein the device further includes a battery charger circuit that receives electrical power from a electrical power source that is located outside the device, the battery charger circuit having only a single lower charging voltage output for supplying recharging electrical current to batteries when the battery charger circuit is connected to the electrical power source, the method comprising the additional steps of:
   a. when the battery charger circuit is connected to the electrical power source, connecting the batteries in parallel and the parallel connected batteries being connected to the power inputs of both the buck DC-DC converter and boost DC-DC converter; and
   b. when the battery charger circuit is not connected to the electrical power source, connecting the batteries in series with:
      i. the series connected batteries being connected to the power input of the boost DC-DC converter; and
      ii. one of the series connected batteries being connected to the power input of the buck DC-DC converter.

* * * * *